(12) United States Patent
Spiro (10) Patent No.: US 11,555,287 B2
(45) Date of Patent: Jan. 17, 2023

(54) CELLULAR AND BALLASTED UNIVERSAL POLE FOUNDATION

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

(*) Notice: Subject to any disclaimer, the term of this patent is extended or adjusted under 35 U.S.C. 154(b) by 510 days.

(21) Appl. No.: 16/715,908

(22) Filed: Dec. 16, 2019

(65) Prior Publication Data

US 2020/0181866 A1  Jun. 11, 2020

Related U.S. Application Data

(60) Division of application No. 16/200,899, filed on Nov. 27, 2018, now Pat. No. 10,724,202, which is a
(Continued)

(51) Int. Cl.
*E02D 27/42* (2006.01)
*E04H 12/22* (2006.01)
(Continued)

(52) U.S. Cl.
CPC ......... *E02D 27/42* (2013.01); *E04H 12/2269* (2013.01); *E04H 12/2284* (2013.01);
(Continued)

(58) Field of Classification Search
CPC . E02D 27/42; E02D 2300/00; E02D 2600/00; E04H 12/2269; E04H 12/2284;
(Continued)

(56) References Cited

U.S. PATENT DOCUMENTS

| 1,611,935 A | 12/1926 | Mitchell |
| 1,799,314 A | 4/1931 | Pfaff |

(Continued)

OTHER PUBLICATIONS

Svensson, Henrik, "Design of Foundations for Wind Turbines", 2010, Structural Mechanics, LTH, Sweden. (Year: 2010).*
(Continued)

*Primary Examiner* — Cedric Johnson
(74) *Attorney, Agent, or Firm* — Xsensus LLP (57) ABSTRACT

A volumetric enclosure or enclosures and/or a cellular structure pole foundation is provided. The volumetric enclosure/s or cellular structure pole foundation may employ several embodiments: (1) a single or a plurality of volumetric enclosures at the vertical center of the foundation below the foundation's pole cavity; (2) a single or a plurality of volumetric enclosures at the vertical center of the foundation below the foundation's pole cavity and a cellular structure within the foundation walls and base; (3) a cellular structure throughout the entire body of the foundation; (4) a cellular structure within the foundation walls; (5) the above embodiments with fill material consisting of gas or fluid or solids retained inside the foundation walls; and (6) the above embodiments with solid fill material that can reach the foundation core through the pole cavity.

20 Claims, 5 Drawing Sheets

Related U.S. Application Data continuation-in-part of application No. 15/722,910, filed on Oct. 2, 2017, now Pat. No. 10,280,581, which is a continuation of application No. 15/404,051, filed on Jan. 11, 2017, now Pat. No. 9,777,456.

(60) Provisional application No. 62/590,837, filed on Nov. 27, 2017.

(51) Int. Cl.
*G06F 30/13* (2020.01)
*G06F 111/10* (2020.01)

(52) U.S. Cl.
CPC ......... *E04H 12/2292* (2013.01); *G06F 30/13* (2020.01); *E02D 2300/00* (2013.01); *E02D 2600/00* (2013.01); *G06F 2111/10* (2020.01)

(58) Field of Classification Search
CPC ..... E04H 12/2292; G06F 30/13; G06F 30/00; G06F 2111/10
USPC ............................................................. 703/1
See application file for complete search history.

(56) References Cited

U.S. PATENT DOCUMENTS

| | | | |
|---|---|---|---|
| 2,784,015 A | 3/1957 | Swanson | |
| 5,632,464 A | 5/1997 | Aberle | |
| 6,494,643 B1 | 12/2002 | Thurner | |
| 7,556,752 B1 | 7/2009 | Hicks | |
| 7,694,487 B1 | 4/2010 | Ryan | |
| 7,765,770 B2 | 6/2010 | Fournier | |
| 7,954,289 B2 | 6/2011 | Evans | |
| 8,966,837 B2 | 3/2015 | Knudsen | |
| 9,777,456 B1 | 1/2017 | Spiro | |
| 10,280,581 B2 | 5/2019 | Spiro | |
| 2001/0029432 A1* | 10/2001 | Gidwani | G01V 1/008 702/15 |
| 2003/0145556 A1 | 8/2003 | Young | |
| 2005/0051695 A1 | 3/2005 | Kovach | |
| 2006/0104715 A1 | 5/2006 | Newton | |
| 2007/0022706 A1 | 2/2007 | Fournier | |
| 2009/0025332 A1 | 1/2009 | Richards | |
| 2010/0277290 A1 | 11/2010 | Knudsen | |
| 2013/0212966 A1 | 8/2013 | Knudsen | |
| 2013/0232780 A1 | 9/2013 | Penfold | |
| 2018/0195305 A1 | 7/2018 | Bishop, III et al. | |

OTHER PUBLICATIONS

Al Hamaydeh, Mohammad et al., "Optimized Frequency-Based Foundation Design for Wind Turbine Towers Utilizing Soul-Structure Interaction", Apr. 24, 2010, Journal of the Franklin Institute 348, Elsevier Ltd. (Year: 2010).*

Spiro, Daniel S. Universal Pole Foundation, Patent Cooperation Treaty Application Serial No. PCT/US2018/13148, filed Jan. 10, 2018, International Search Report and Written Opinion dated May 1, 2018.

https://www.satelliteguys.us/xen/threads/mounting-dish-in-a-bucked-of-concrete.20219/ (Year:2004).

https://web.archive.org/web/20070120094657/http://www.wikihow.com/Installl-a-Temporary-Mail-Box-Without-a-Post-Hold-Digger (Year: 2006).

* cited by examiner

CELLULAR AND BALLASTED UNIVERSAL POLE FOUNDATION

CROSS REFERENCE TO RELATED APPLICATION[S]

This application is a divisional of the earlier U.S. Utility Patent Application entitled "CELLULAR AND BALLASTED UNIVERSAL POLE FOUNDATION," Ser. No. 16/200,899, filed Nov. 27, 2018, which is a continuation-in-part of the earlier U.S. Utility Patent Application entitled "UNIVERSAL POLE FOUNDATION," Ser. No. 15/722,910, filed Oct. 2, 2017, now U.S. Pat. No. 10,280,581, which is a continuation of the earlier U.S. Utility Patent Application entitled "UNIVERSAL POLE FOUNDATION," Ser. No. 15/404,051, filed Jan. 11, 2017, now U.S. Pat. No. 9,777,456, and Ser. No. 16/200,899 claims priority to U.S. Provisional Patent Application having Ser. No. 62/590,837, filed Nov. 27, 2017, the disclosures of which are hereby incorporated entirely herein by reference.

BACKGROUND OF THE INVENTION

Technical Field

The innovation is in the field of construction, more specifically in the means and methods of foundation construction.

State of the Art

Conventional pole erection having a base plate requires lowering a pole onto a foundation with embedded threaded anchor bolts. The threaded anchor bolts pass through the pole's base plate. The pole is then secured to the foundation and then plumbed. The entire process of erecting a conventional pole and foundation is lengthy, requiring coordination between material suppliers and construction trades. The construction process is time sensitive. Coordinating multiple parties comes with risks of delay. These delay risks are compounded when having to work in outdoor conditions subject to unpredictable weather. Other drawbacks to the conventional pole erection method include: use of pole base plate adds cost to the pole and is foundation-specific, governed by anchor bolt bore spacing, having to refinish the above grade portion of the foundation following pole erection, corrosion exposure requiring periodic inspections and occasional maintenance work. The construction industry has a persistent need for an economical and rapid installation solution for erecting poles eliminating the drawbacks of the conventional means and methods.

SUMMARY OF THE INVENTION

This innovation expands on the art taught employing contemporary engineering production methods which in turn innovate pole and pole foundation construction methods. Spiro's U.S. Pat. No. 9,777,456 B1, FIGS. 3a-d show the pre-fabricated foundation installation four key steps: auguring, bedding, foundation placement, and backfilling. In Spiro's continuation 01, Spiro teaches about a cellular pole foundation having a foundation pole cavity retaining fill material whereas only its pole foundation cavity retains fill material from within the cavity opening. Using this method, backfill and compaction of soil and other fill material is accomplished outside the foundation walls. Continuation 01 also shows in FIGS. 11A and 11B the core section cross-section can be of a cruciform and round shape. In FIGS. 13A and 13B, Spiro shows an enlargement of the cellular structures as taught in U.S. Pat. No. 9,777,456 column 8 line 35 "The pre-fabricated pole foundation 1 formed of polymer material, some or all of the components may have honeycombed structure and/or other cellular structure". The foundation may also employ non-corrosive material that are made of metallic or non-metallic material. This innovation claims the utility benefit is derived from the employment of cellular foundation structure having one or a plurality of voids within the structure. The cellular and/or volumetric structure may be absent of any metallic reinforcement eliminating the risk of corrosion and enabling thinner foundation wall design. The cellular and/or volumetric structure light weight absent of a need for metallic reinforcement can reduce the foundation's size further providing cost benefit and ease of handling.

In addition to the physical design properties of this innovation, the fabrication of this innovation may include the use of an interactive program that enables optimization of the foundation's design. The program takes into account all design parameters needed. The program is capable of generating documents from design to fabrication in real time. The use of the program reduces pre-construction steps, further reducing the foundation's overall cost and production time.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIGS. 1 A-D show the foundation erection process as shown in Spiro's U.S. Pat. No. 9,777,456.

FIGS. 2 A-D show the foundation erection process for pole foundation embodiment of cruciform cross section employing volumetric cells.

FIGS. 3 A-D show the foundation erection process for pole foundation embodiment of round cross section employing volumetric cells.

FIGS. 4A-4D-D show pole elevation and sections of the pole foundation embodiment employing volumetric and/or cellular cells.

FIGS. 5A, 5B-A, 5B-B and 5C show horizontal sections of pole foundation embodiment employing volumetric and/or cellular structure.

DETAILED DESCRIPTION OF EMBODIMENTS OF THE INVENTION

The most common erection method for pole foundation is the conventional "pour-in-place". This on-site concrete pour method entails the following steps:
  a. Ordering materials such as steel rebar, gravel, plywood, and forms;
  b. Scheduling onsite drop ship dates for the above materials;
  c. Ordering luminaires and poles, often requiring that anchor bolts pre-ship prior to balance of order arrival;
  d. Constructing the steel cage for the concrete foundation structural reinforcement;

e. Constructing plywood templates for the anchor bolts and secure the bolts with the template to cage;
f. Scheduling a date for concrete pour;
g. Augering foundation bores and, where needed, providing bedding material for the foundation (weather permitting);
h. Dropping forms with rebar cage into bores, plum and secure them, or dropping the steel rebar cages into forms after the forms were plumbed and secured in bores. The steel rebar cages could be inserted inside the form or following;
i. Making all pre-pour electrical connectivity prep work;
j. Backfilling and compacting soil around the forms if needed;
k. Scheduling a crane for pole standing;
l. Pouring concrete, vibrating inside the forms and waiting until concrete cures (weather permitting);
m. Assembling pole and luminaire(s) and/or other devices;
n. Using a crane, lower pole assembly on pole base securing pole to foundation with anchor bolts nuts;
o. Adjusting anchor bolts' nuts to plumb the pole;
p. Removing above grade forms and refinishing the foundation surfaces;
q. Pulling all electrical wire and securing the hand hole cover to pole;
r. Placing pole base cover or architectural nut covers on pole base plate;
s. Refinishing/touching up any scratches, and removing dirt from pole and foundation base; and
t. Powering up pole-mounted devices and verifying proper operation The conventional "pour in place" foundation erection method has significant disadvantages against the pre-fabricated foundation including: 1. Lengthy process requiring coordination with several construction disciplines 2. Lengthy process through having to contend with un-predictable weather patterns 3. Dependency on local trades to deliver consistent quality product across geographically wide area 4. Uncertainty about structural integrity 5. Wide pricing variance across geographic areas The pre-fabricated concrete foundation overcomes several of the "pour in place" conventional foundation erection method however, it has significant disadvantages when evaluated against a pre-fabricated foundation with a volumetric enclosure and/or constructed of cellular structure. Truck loads are restricted to an allowable shipping weight. Heavy foundations necessitate the use of additional trucks, thus increasing shipping costs. Heavy foundation may also require the use of costly loading/unloading machinery while exposing workers to higher risk of injury.

Employing new technologies such as 3D printing enables the fabrication of cellular structures and/or large volumetric enclosure inside the foundation structure, overcoming the disadvantage of employing heavy pre-fabricated concrete foundation. As a result, more foundations can be loaded on a single truck, and the foundation installation requires a minimal load capacity machinery or none to drop the foundation into augured bore. Further, lightweight foundations pose lesser risk of bodily injury.

Expanding on the pole foundation design and fabrication method, using an interactive program, shows reduced production time and cost. The design and fabrication software may include several modules: 1. Design 2. Estimating 3. Jurisdiction submittal 4. Construction 5. Procurement and 6. Fabrication. The input into the modules is by the specifier, by the purchaser and by the manufacturer. The program may have access to an extensive database that may include: a. Pole and pole mounted accessories information b. Environmental conditions in the proximity of the foundation's installed location c. Jurisdictional and national codes pertaining to the foundation and the pole with its device assembly. In addition, the software may have input fields for specifiers' design feature selections and parameters. The program may be supported by artificial intelligence, further assisting the specifier in optimizing the foundation's size, weight, choice of material, overall cost, production time, environmental impact, and other possible criteria. The design, estimating, jurisdiction submittal, construction and procurement modules may reside on the cloud and/or at the specifier's and the purchaser's local office/home computer.

The specifier modules: The foundation's design through its on-site foundation delivery employs an interactive software. The software employs several modules, where human machine inputs flow between the modules. The modules can include design, preliminary budgeting, submittal, construction, procurement, fabrication, and supply logistics modules. The suite of software module processing is typically located at the manufacturer's domain, in the cloud. The information flows in real time from one module to another, and from and to all authorized user. The design module—The design module enables the specifier to narrow down the foundation design to one or several options by entering the design criteria in the fields prompted by the software program. These criteria include geographical location data including soil and wind conditions, structural elements loading, architectural parameters, budgeting limits and the like. Once selection is made, the program generates 2D and/or 3D plans along with specifications and structural calculations for review. The preliminary budgeting module—Once design has been generated, the program can generate a preliminary estimate of the pole foundation unit cost and delivered cost to site. Submittal module—The program may include formatting information accepted by local jurisdictions in submitting the design document with supporting shop drawing/s. The construction module—the foundation installation document, with shop drawing calculations, specification and installation notes, can be incorporated into the specifier's construction set or released as a separate document to the construction trades.

The procurement module—The procurement module is typically accessed by the purchaser. About or upon approval of the design document, the purchaser places the order online with a manufacturer or a manufacturer's representative. The module may include input fields requesting financial information, ship to address, receiving party name and contact information, and foundation's order cost. Upon entering the data, the program may generate an acknowledgement with an estimated delivery date.

The fabrication module—The fabrication module contains all design information converted to fabrication code, enabling the foundation fabrication machinery to produce the foundation. Upon order entry, the module in real time can schedule the production and provide the purchaser with estimated production and onsite delivery dates. Employing an interactive program significantly cuts down design, planning, review, and foundation fabrication and installation time, reducing down the line all associated costs.

The design input fields prompt for information about the geographical conditions. The geographical conditions may include soil conditions and wind speed. Then the design software prompts input about the elements' size, weight, and location to be put on the pole. Then, the design software prompts input about the architectural preference/s including budget limitation/s.

Unlike the design of a concrete foundation reinforced by steel, the additive technology fabrication process is more comprehensive. The structural design for the concrete foundation relies predominantly on the foundation's compression and tensile strength of solids such as concrete and steel. By contrast, the cellular, volumetric or cellular and volumetric foundation employs internally enclosed spaces. The specifier decide on which geometry will best optimize the foundation's structural requirements, size, weight, and cost. For example, the specifier may choose to employ a beehive structure, or a 3-D perforated design as seen across a mammal's bone. The size of the opening, the cell wall thickness, the material cost, the production time, and other like parameters influence the designer's decision.

To assist the specifier, the software comes with an extensive database that includes relevant calculation formulas and historical location data. The software may also include built-in weighted and relational logic to process several parameters' input and deliver a recommended design. In addition, the software may have a self-learning capability, tracking and improving its recommended solution/s based on past solution performance. The interaction between the specifier and the machine is key for overall successful execution. In operation, software may be employed in a design system having a server and at least one user computing device coupled to the server, wherein the server includes a memory storing the data utilized for the calculations. The user computing device may be coupled to the server through a network connection and may operate to provide input to the server, wherein the server is programmed to automatically design a pole foundation.

The present innovation cellular and volumetric design structures may include several embodiments:
a. A single volumetric or a plurality of volumetric enclosures at the vertical center of the foundation below the foundation's pole cavity.
b. A single volumetric or a plurality of volumetric enclosures at the vertical center of the foundation below the foundation's pole cavity and cellular cell structure within the foundation walls and base.
c. A cellular structure throughout the entire body of the foundation.
d. A cellular structure within the foundation's walls.
e. The above embodiments with fill material consisting of gas or fluid or solid retained inside the foundation's walls.
f. The above embodiments with solid fill material that can reach the foundation core through the pole cavity.

The configuration above may include at least one inlet and at least one outlet to fill fluid into the foundation structure. The fluid can be water or any other admixture. The fluid can remain in a liquid state or in coming in contact with air or other fluid can change state and harden. At the inlet spout an anti-tampering cap is installed after filling the foundation with fluid. At the outlet spout, an anti-tampering cap or a cap with a breather or a valve can be installed. Having the additional weight of the fluid or the hardened material adds compressive axial weight to the foundation makes the foundation wall more resistant to impact and adds greater resistance to uplift forces. Granular solid material may also be used to ballast the foundation. The granular material can be poured through the inlet spout and/or through the pole cavity.

In Spiro's U.S. Pat. No. 9,777,456 column 7 line 51, Spiro teaches "In special applications, where spread footing is needed, a keyed recessed protrusion at the bottom of the base section 5 anchors the prefabricated pole foundation 1 to a reciprocating key at the top of the spread footing". The present innovation expands on the prior teaching by further describing a keyed foundation. The keyed spread footing or both to retain a volumetric cavity and/or cellular structure, whereas the volumetric cavity or the cellular structure can be filled with fluid. In addition, the entire prefabricated foundation can be made of at least one contiguous element and when two or more contiguous elements are employed, these elements are mechanically keyed, they can employ fastening devices and they are field assembled (not shown).

This innovation can further simplify the pole erection process by eliminating the use of a threaded plate embedded in a recess in the pole cavity inner wall, replacing the threaded plate's functionality with a factory prefabricated threaded through bore, whereas the bore is made of the same material as the foundation wall.

Figures 1A, 1B:
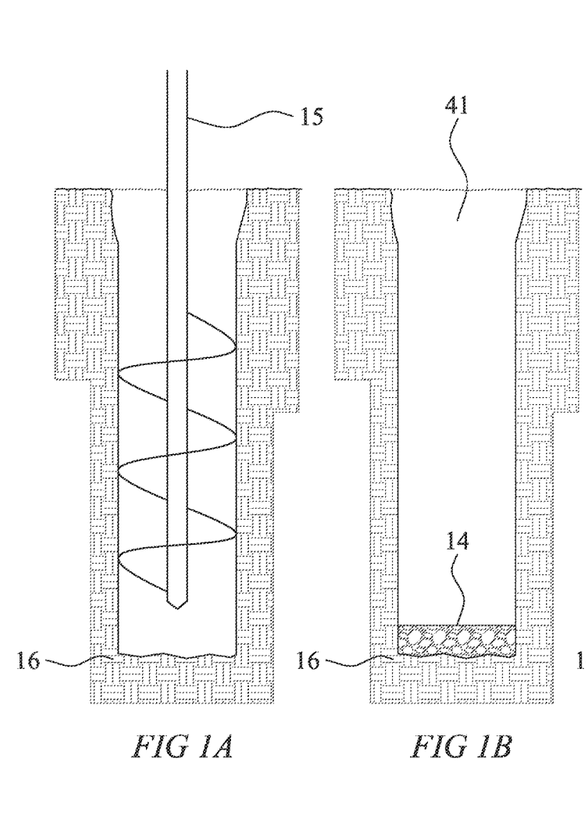
Figure 1C:
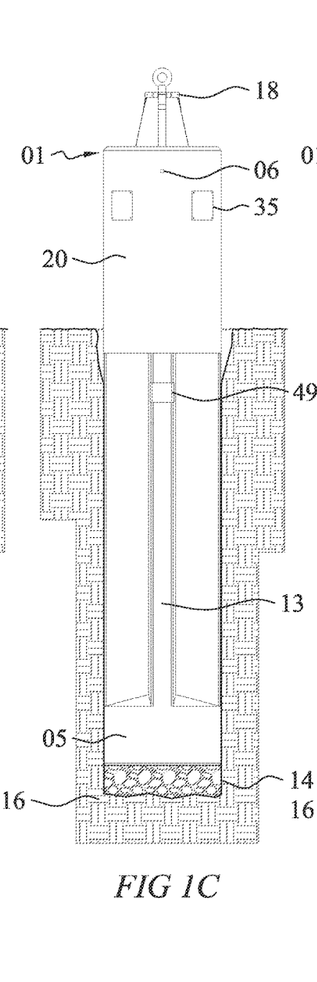
Figure 1D:
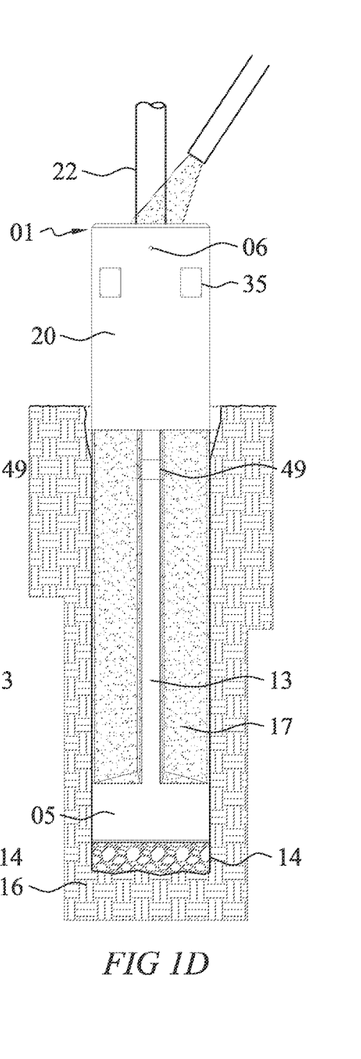
Figures 2A, 2B:
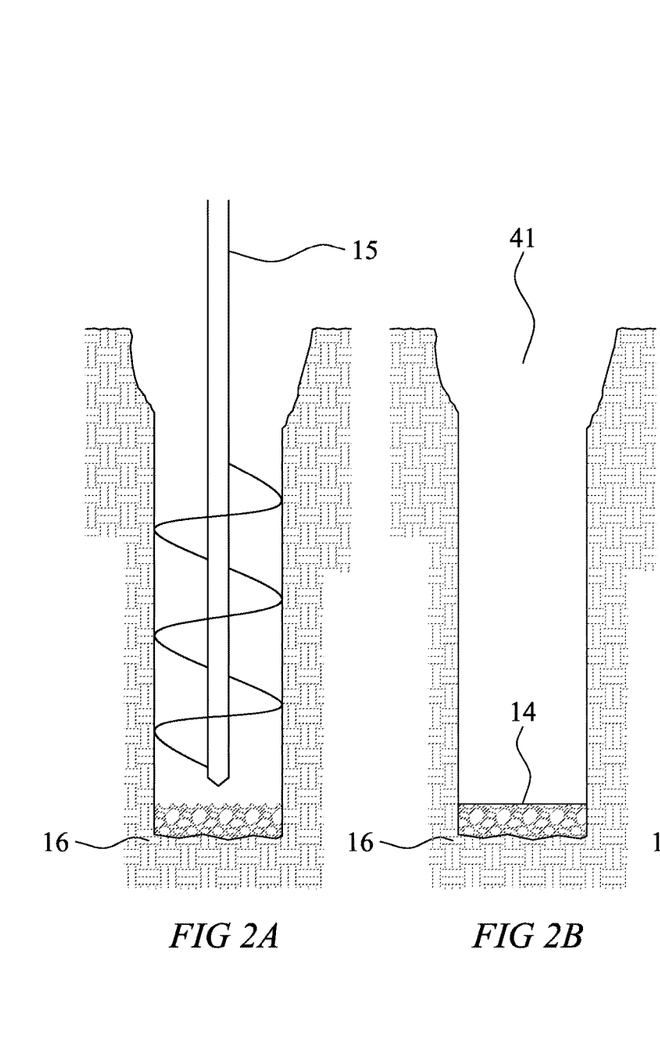
Figures 2C, 2D:
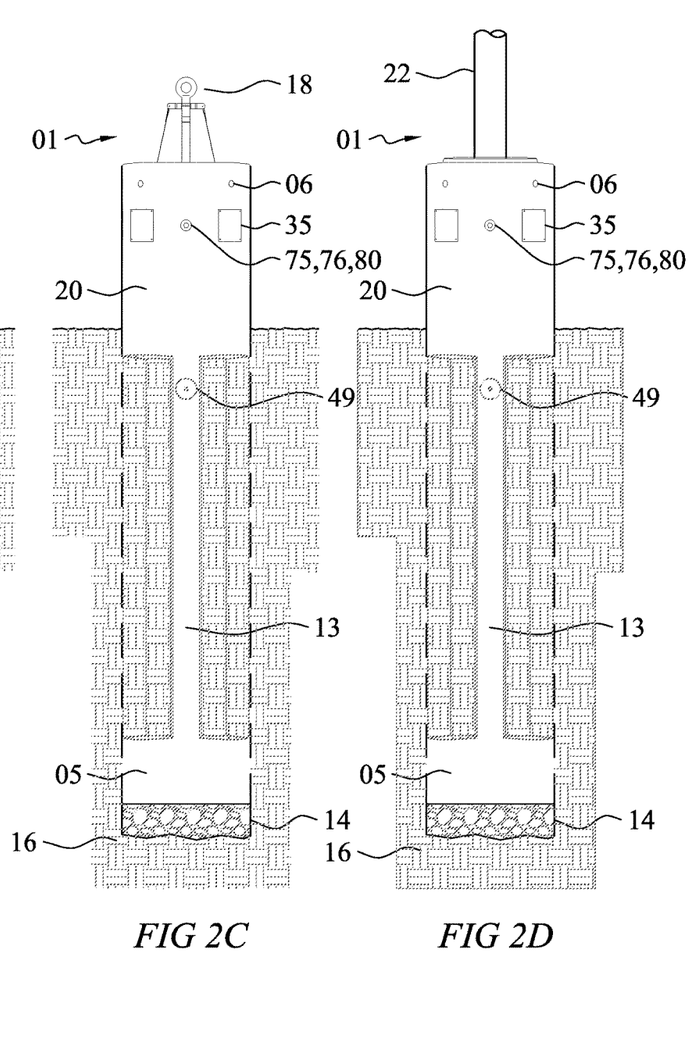
Figures 3A, 3B:
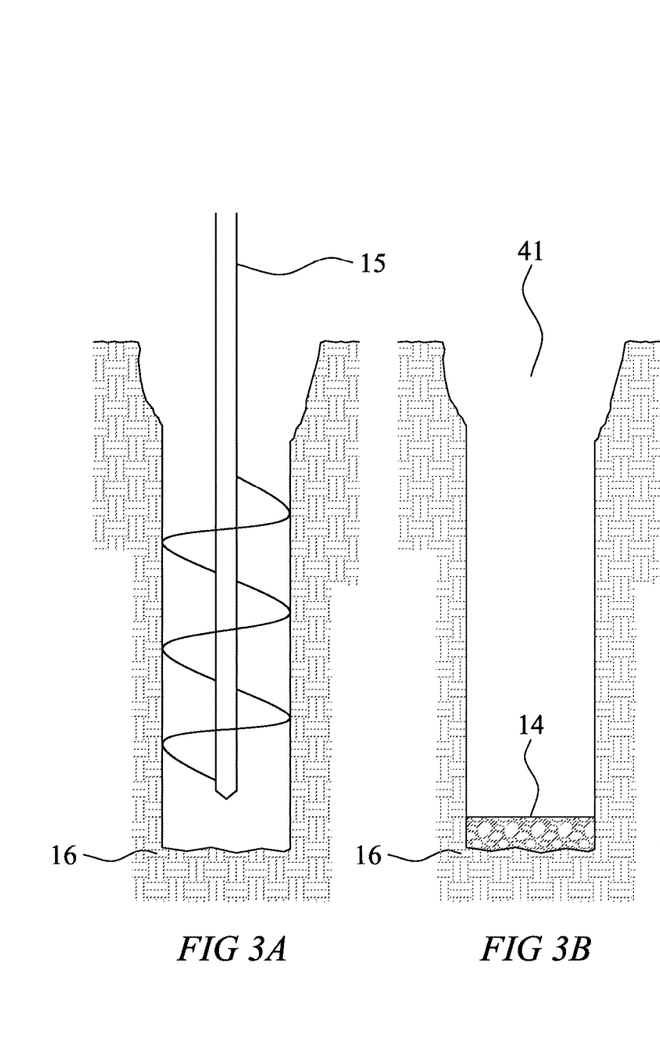
Figures 3C, 3D:
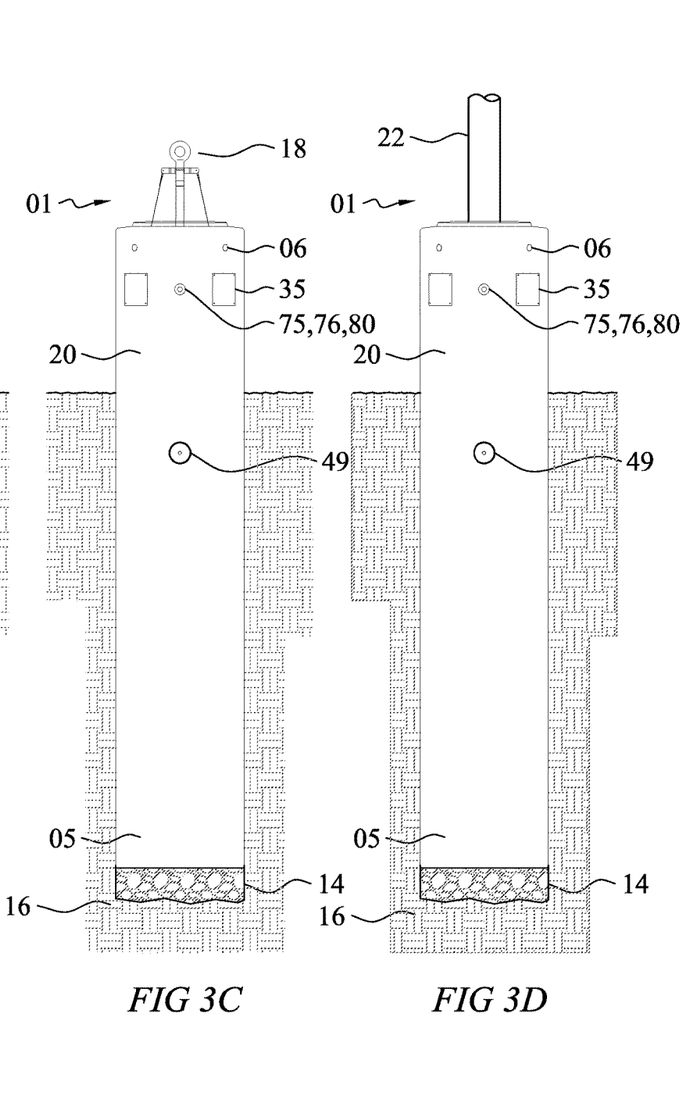

FIGS. 1A-D show the prefabricated pole foundation placement process inside an augured bore 41 in the soil. These Figs. are shown in Spiro's parent U.S. Pat. No. 9,777,456 B1. In FIG. 1A the bore is augured. In FIG. 1B the bottom of the bore is bedded. In FIG. 1C the pre-casted foundation 1 (also shown in the figures as "01") is lowered inside the bore. As discussed in U.S. Pat. No. 9,777,456, FIG. 1C includes a through leader bore 6, core walls 13, bedding 14, auger bit 15, soil 16, hoisting harness 18, and non-corrosive J-boxes 49. In FIG. 1D a fill material 17 is poured through the pole cavity 9 top making its way down to the top of the foundation base section 94. Fill material 17 occupies all the voids between the foundation's exterior wall 95 and the face of the bore in the soil. In continuation 1, Spiro teaches about fill material 17 poured into the pole cavity 9 of the pre-fabricated foundation to provide lateral stability to the pole 22. Other fill material 17 is poured and compacted from the foundation exterior wall 95 providing lateral support to the foundation's core 4 and base sections 5.

FIGS. 2A-D and 3A-D show two elevational embodiments of the pre-fabricated foundation 1 placement process inside an augured bore with enclosed bottom pole cavity 9. Innovating both the parent patent and continuation 1, present invention show means to reduce shipping weight of the pre-fabricated foundation by introducing volumetric enclosure/s 73 and/or cellular structure 70 inside the foundation's structure. FIGS. 2A-2D show the pre-fabricated foundation placement of a cruciform profiled core section 4 foundation 1 with an elongated volumetric enclosure 73 at the vertical center of the foundation extending the length of the core section 4. This embodiment can be filled with fluid from an inlet spout 80 located at the pole cavity exterior wall 20 upper section. In a different embodiment, filled fluid can also fill the cellular structure 70 inside the foundation's cellular walls 69 or the foundation's cellular walls 69 and the base core section 5.

FIGS. 3A-3D show the pre-fabricated foundation placement of a round profiled core section 4 foundation 1 with an elongated volumetric enclosure 73 at the vertical center of the foundation 1 extending the length of the core section 4. This embodiment can also be filled with fluid as described above and perforate the fluid into the cellular structure 70 of the foundation's cellular walls 69 and the base core section 5. In a different embodiment, a substantial portion or all the embodiment structure can be fabricated of a cellular structure 70 and fluid entering the inlet spout 80 can reach some or all the cells.

Figures 4A, 4B:
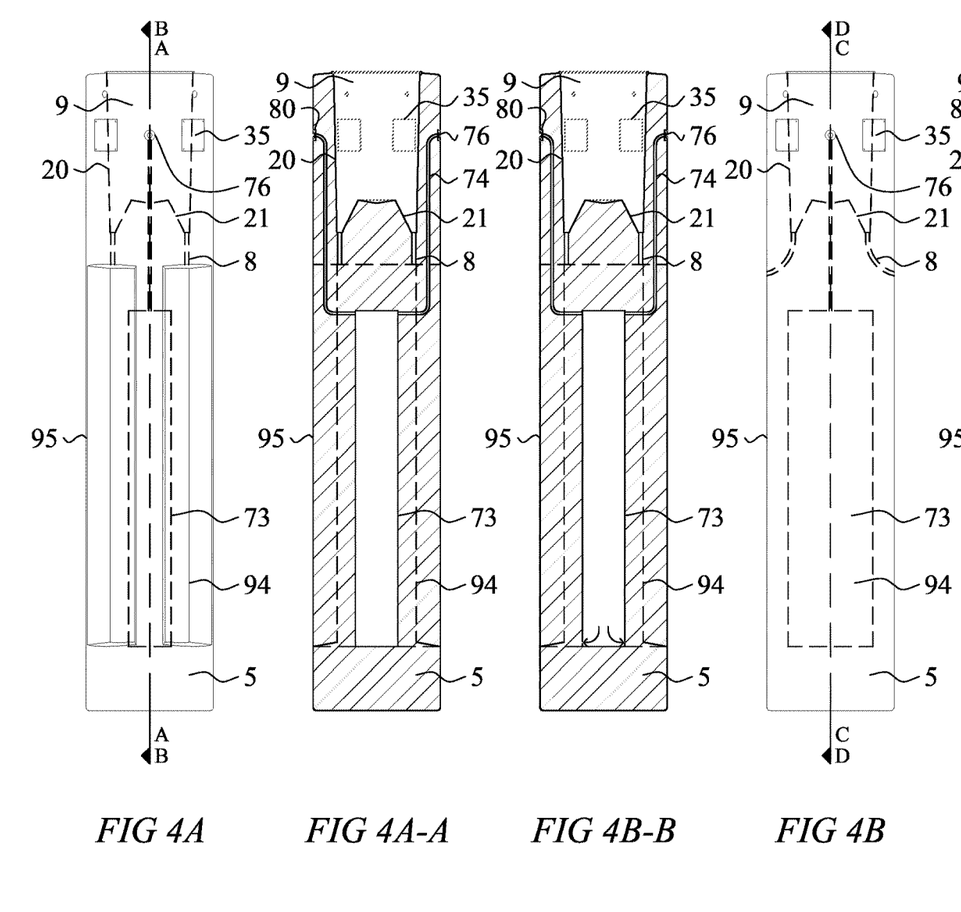
Figure 4C:
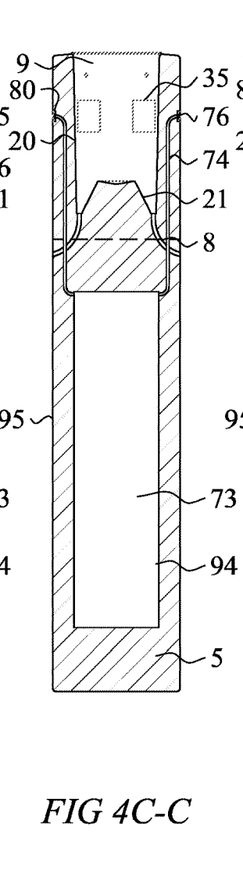
Figure 4D:
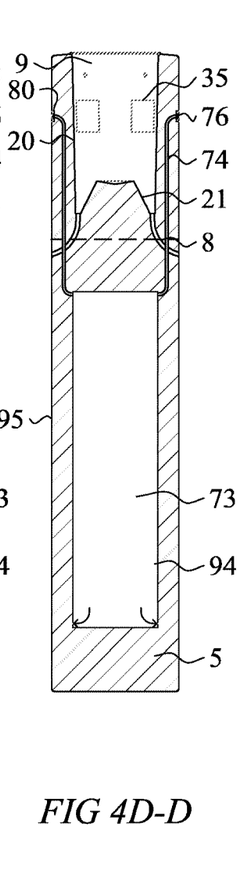

FIG. 4A and FIG. 4B show the elevation of the Figs. described in FIGS. 2A-2D and 3A-3D. FIG. 4A-A and FIG. 4B-B show sections of the cruciform profiled foundation 1 at the core section 4 with a volumetric enclosure 73 extending along the core section's 4 vertical axis. FIG. 4A-A retains fluid at the volumetric enclosure 73 only, while FIG. 4B-B permits fluid 72 to travel through the foundation's walls cellular structure 70 and/or the foundation's walls cellular structure 70 and base section 5 cells. FIGS. 4C-C and FIG. 4D-D show sections of the round profiled foundation at the top of the core section 94 with a volumetric enclosure 73 inside the foundation's wall extending along the core section's 4 vertical axis. FIG. 4C-C retains fluid at the volumetric enclosure 73 only while FIG. 4D-D permits fluid 72 to travel through the foundation's walls cellular structure 70 and/or the foundation's walls cellular structure 70 and base section 5 cells. The sections shown in FIGS. 4A-A, 4B-B, 4C-C, and 4D-D share these common elements: inlet spout 80, fluid outlet 76, valve 75, fluid pipe 74, through opening 8, pole cavity 9, device enclosure 35, power/data conduit 29, and volumetric enclosure 73.

Figure 5A:
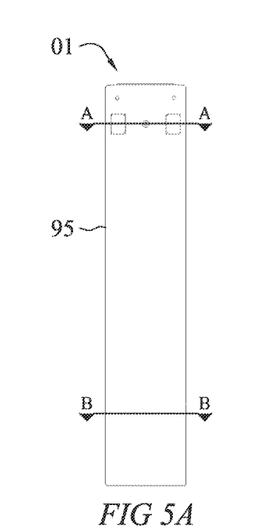
Figure 5B:
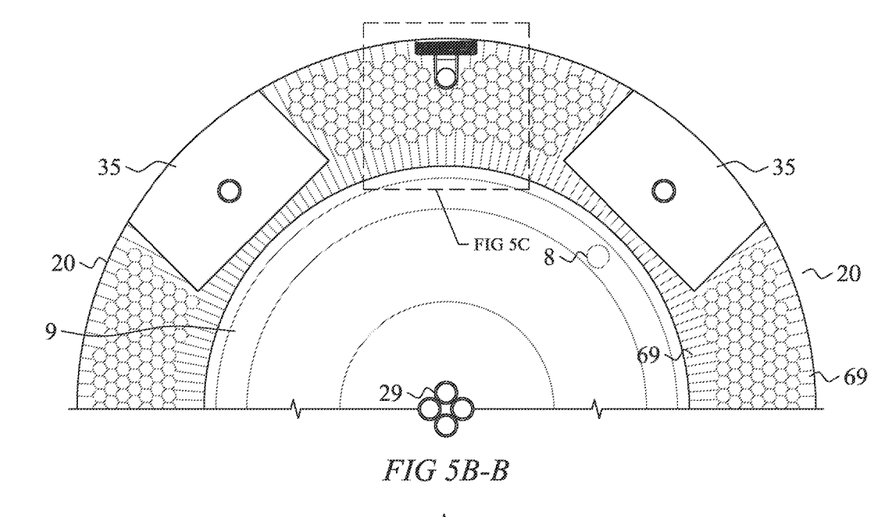
Figure 5C:
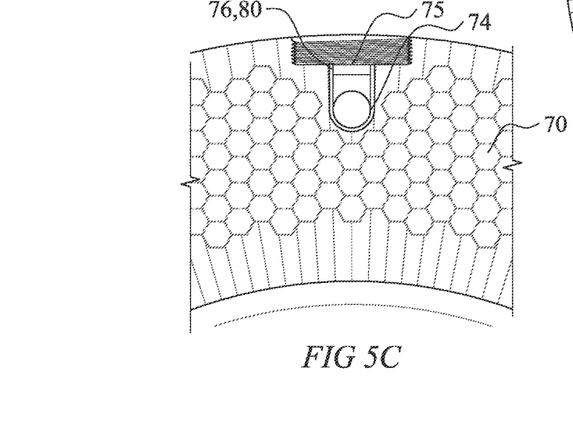

FIGS. 5A, 5B-B and 5C show enlargements of the volumetric enclosure 73 and the cellular structure 70 inside the foundation walls. FIG. 5A shows the foundation elevation with horizontal section designators. FIG. 5A-A shows a partial horizontal section at the pole cavity 9. Elements enumerated include: the inlet spout 80, fluid pipe 74, cellular structure 70, exterior wall of pole cavity 20, foundation pole, power/data conduit 29, through opening 8, tapered structure 21, and device enclosure 35. 5B-B shows a partial horizontal section at the bottom of the round core foundation above the foundation's base section 5. Elements enumerated include: cellular structure 70, top of foundation base 94, volumetric enclosure 73, cellular wall 69 and foundation exterior wall 95. FIG. 5C shows the horizontal enlarged section of the pole cavity 9 at the electrical/data enclosure 35 elevation depicting the inlet spout 80 opening and the fluid pipe 74 riser inside the cellular structure 70 wall to enable fluid to travel to the volumetric enclosure 73 and/or perforate throughout the cellular walls of foundation including the base section 5.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A system for producing a pole foundation, the system comprising:
a remote and/or local user input device and a server having: a transceiver, a memory and a processor storing and operating a software program for generating a pole foundation design;
a user input device communicatively coupled to the server for providing data input to the server, wherein;
processor of the server executes at least one artificial logic algorithm and in response to receiving at least one of: data input from the user input device, and server stored and/or remotely accessed data and/or instructions, automatically generate at least one:
pole foundation drawings in two-dimensional formats and/or three-dimensional formats;
structural analysis calculations;
product specifications;
fabrication drawings that include the pole foundation design, and the product specification, and include results of the structural analysis;
a foundation program includes at least one algorithm that optimizes a structural design while minimizing production costs and/or shipping costs, and
fabricate the pole foundation.

2. The system of claim 1, wherein the foundation program includes data and/or instructions performed by the server to account for at least one of environmental conditions in a locality of use of the pole foundation; structural loading of the pole and pole mounted devices; codes and/or requirements of governing authorities; optional features selected by a designer operating an input device; and at least one pole foundation size, material and weight optimization algorithm.

3. The system of claim 1, wherein the foundation program includes instructions performed by the server to generate at least one of a foundation unit cost proposal; a foundation shipping weight; a foundation shipping dimension; a quantity or pole foundations per truck flatbed size; and a shipping date corresponding to an order entry.

4. The system of claim 1, wherein the foundation program includes an algorithm that generates a document for a municipal plan review submittal.

5. The system of claim 1, wherein the server residing foundation program can retrieve data by self-initiated information query to a remote device.

6. A system for producing a pole foundation, the system comprising:
a user remote input device and a server having: a transceiver, a memory and a processor storing and operating a software program for generating a pole foundation design; and
a user input device communicatively coupled to the server for providing data input to the server, wherein:
the processor of the server executing at least one artificial logic algorithm and in response to receiving at least one of: data input from the user input device, and server stored and/or remotely accessed data and/or instructions, wherein the program employs a procurement module, and at least one of a specifier module, a design module, a budgeting module, a submittal module, a construction module, a fabrication and shipping scheduling module, wherein at least two modules are communicatively coupled together through the server, and
the procurement module enables a purchaser to procure the pole foundation online and obtain projected foundation delivery date.

7. The system of claim 6, wherein pole foundation data from at least design process through pole foundation on site delivery flows in real time between at least one human and at least one remote software module and/or between plurality of integrated modules.

8. The system of claim 6, wherein the design module optimizes the foundation design employing at least one parameter of: geographical location, soil condition, wind conditions, structural elements loading, architectural appearance, budget limitation.

9. The system of claim 6, wherein the design module generates 2D and/or 3D plans along with specifications and structural calculations.

10. The system of claim 6, wherein the budgeting module generates a preliminary estimate of the pole foundation unit cost delivered to site.

11. The system of claim 6, wherein the submittal module may generate submittal information formatted to meet the required local plan review jurisdiction standard.

12. The system of claim 6, wherein the construction module generates the foundation's installation document to be used by an installer in the field.

13. The system of claim 6, wherein the fabrication module automatically converts the foundation design into fabrication code that enables fabrication machinery to produce the foundation as specified.

14. A method of performing pole foundation design and fabrication using at least one remote input device and a server operating a software program, the method comprising:
   configuring optimal foundation designs;
   generating a fabrication file, and at least one of: design, specification, calculation, budgeting, and procurement file in response to completion of the foundation designs and saving a file comprising the foundation designs; and
   fabricating a pole foundation according to instructions of the fabrication file, wherein the fabricated pole foundation is monolithic having cellular enclosures, volumetric enclosures or cellular and volumetric enclosures, and the foundation is fabricated by additive technology.

15. The method of claim 14, wherein the pole foundation receives and retains straight shaft poles and tapered shaft poles of different cross-sectional profile.

16. The method of claim 14, wherein a pole is formed of metallic or non-metallic material.

17. The method of claim 14, wherein the software program may also include built-in weighted and relational logic to process at least one of environmental, structural, jurisdictional and architectural parameter, and may include a self-learning code to track and improve its performance.

18. The method of claim 14, wherein the generating includes generating a document for a municipal plan review submittal.

19. The method of claim 14, further comprising:
   retrieving data by self-initiated information query to a remote device.

20. The method of claim 14, wherein the generating includes generating 2D and/or 3D plans along with specifications and structural calculations.

* * * * *